Oct. 4, 1966    C. F. FITZGERALD ETAL    3,276,563
HIGH SPEED CONVEYOR SYSTEMS
Filed May 26, 1964    3 Sheets-Sheet 1

Inventors
Charles F. Fitzgerald
Charles J. Ioannilli
Robert F. Lane
By their Attorney
Edward W. Fearing

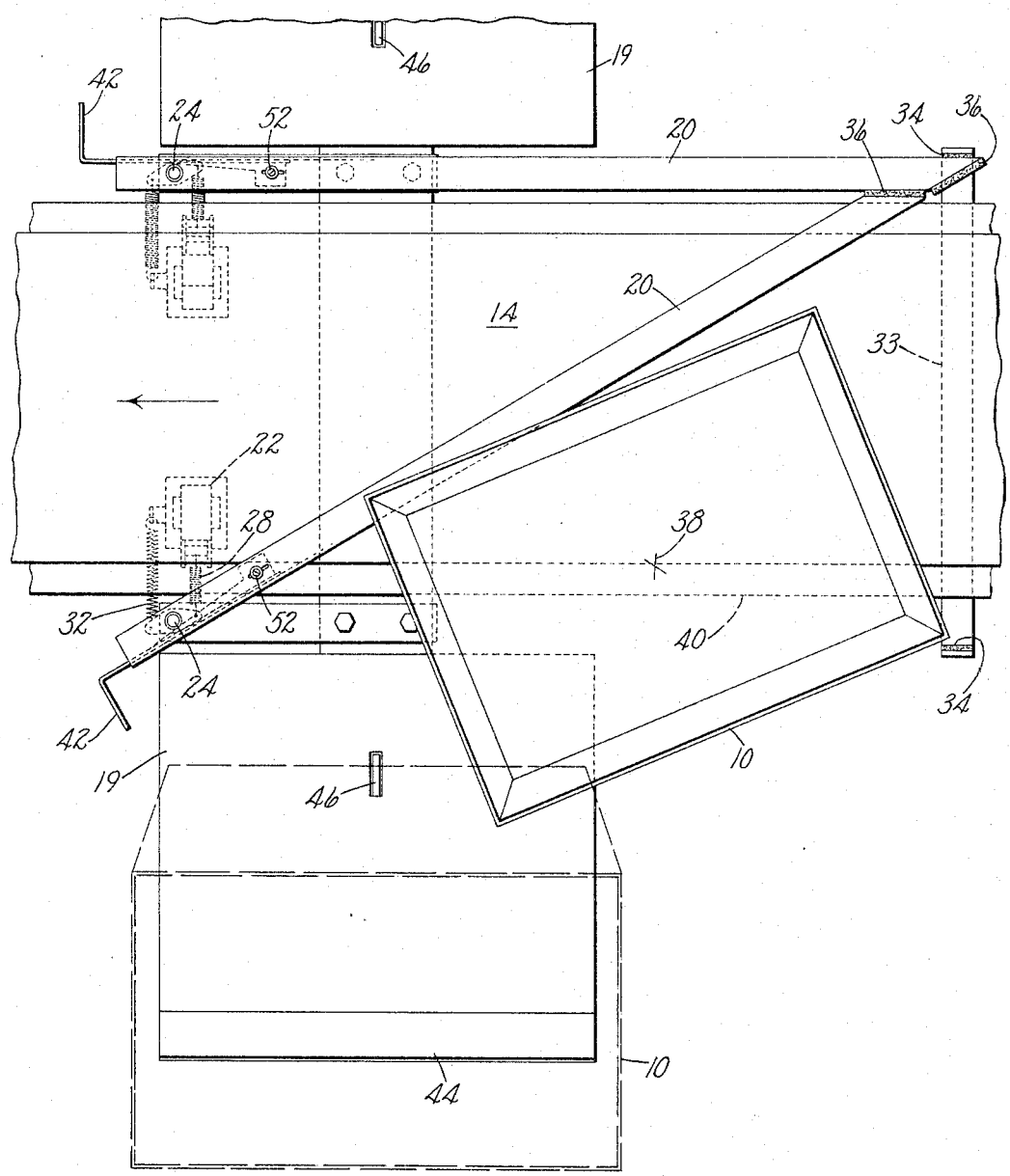

Oct. 4, 1966     C. F. FITZGERALD ETAL     3,276,563
HIGH SPEED CONVEYOR SYSTEMS
Filed May 26, 1964     3 Sheets-Sheet 3
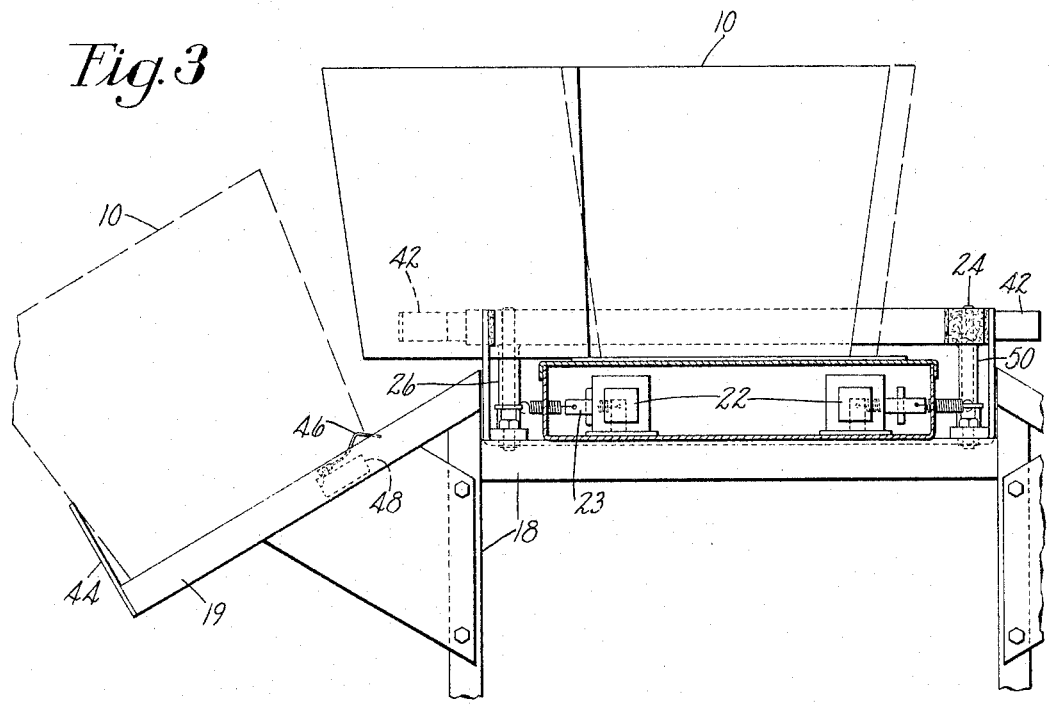
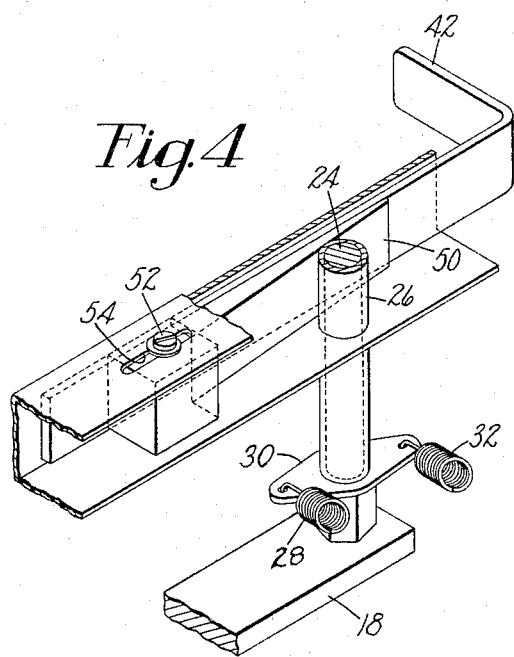
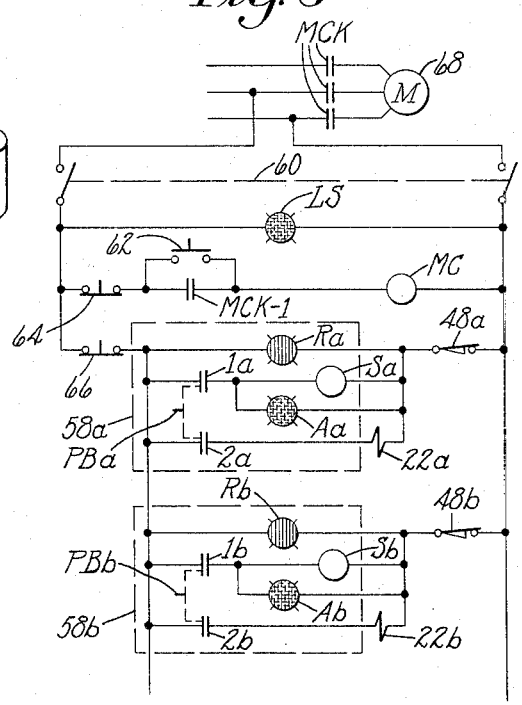

United States Patent Office 3,276,563
Patented Oct. 4, 1966

3,276,563
HIGH SPEED CONVEYOR SYSTEMS
Charles F. Fitzgerald, Beverly, Charles J. Ioannilli, Roxbury, and Robert F. Lane, Danvers, Mass., assignors to United Shoe Machinery Corporation, Flemington, N.J., a corporation of New Jersey
Filed May 26, 1964, Ser. No. 370,281
8 Claims. (Cl. 198—28)

This invention relates to improvements in frictional transportation by belt conveyor systems of uniformly shaped work articles or carriers arranged to be dispatched from a supply station to variously spaced work storage stations disposed long the belt, by the use of deflectors for diverting a carrier from the belt without stopping it or unnecessarily delaying the continuous operation of the system. Such system is disclosed broadly in an application for United States Letters Patent Serial No. 337,042, filed January 10, 1964 upon application of Charles J. Kitchener.

The transportation system of the prior application utilizes a flat belt, along the course of which a series of deflectors each comprising a diverting arm, are mounted for intercepting movement across the belt to deflect an article or carrier of predetermined uniform dimensions partly from the belt and, thereafter to actuate the diverting arm back to its original nonintercepting position, pushing the carrier off the belt onto a work storage platform. In order to actuate the diverting arm in this way substantial force is required by the use of a fluid operated cylinder with suitable piping and electrically actuated control valves, which not only are costly to manufacture but are subject to disabilities in the way of clogging or hydraulic leakage.

An object of the present invention is to simplify and improve the construction and mode of operation for a frictional belt transportation system having diverting arms capable of being actuated to deflect carriers from the belt, in which the belt is operated at a higher rate of speed than in the prior system, so that the carriers being dispatched may be shifted completely off the belt and onto work storage platforms without the necessity of interrupting unnecessarily the use of the conveyor or of using a separate source of power for actuating the diverting arms to dislodge the carriers, the kinetic energy alone of the carriers being utilized to remove them from the belt storage stations.

In other respects the objects of the invention are to increase the capacity and speed of delivery for a conveyor system while at the same time simplifying and improving its reliability in operation and rendering the construction less expensive to manufacture or service.

In the specific embodiment of the present invention the conveyor system includes a single work supply and a plurality of work storage stations mounted along an elongated frame for supporting a continuously moving belt and a series of deflectors, one at each work station capable of being moved into a diagonal intercepting position along the belt, there being a work carrier storage platform for each work station, in which a shock absorbing abutment is mounted on each deeflctor to arrest the progress of the carrier along the belt and to shift both the carrier off the belt and the deflector to a nonintercepting position promptly. Preferably, a spring is connected between the deflector and its actuating means to be stressed by the actuating means in moving a deflector across the belt so that the spring is stressed further as the carrier is brought to rest, thus assisting in absorbing the kinetic energy of the carrier. As illustrated, each storage platform has on it a carrier sensing lever to cause the deflector actuating means to release the stress in the spring as soon as a carrier comes to a stable position of rest on the storage platform. To insure proper operation of the sensing lever each platform has a buffer plate located in a position with relation to the sensing lever at a distance less than the width of a carrier.

These and other features of the invention, as hereinafter described and claimed, will readily be apparent to those skilled in the art from the following detailed specification taken in connection with the accompanying drawings, in which:

FIG. 2 is a partial plan view of two work stations in the conveyor system at opposite sides of the conveyor, one of the stations being shown during delivery of a work carrier;

FIG. 3 is a sectional view in end elevation taken along the line III—III of FIG. 1, indicating the manner in which a work carrier is removed completely from the conveyor belt before a diverting arm comprising the deflector is permitted to return to its nondiverting position;

FIG. 4 is an enlarged detail perspective view, partly broken away and in section of a portion of the diverting arm, illustrating its manner of mounting and support; and FIG. 5 is a schematic wiring diagram of the conveyor system.

Figure 1:
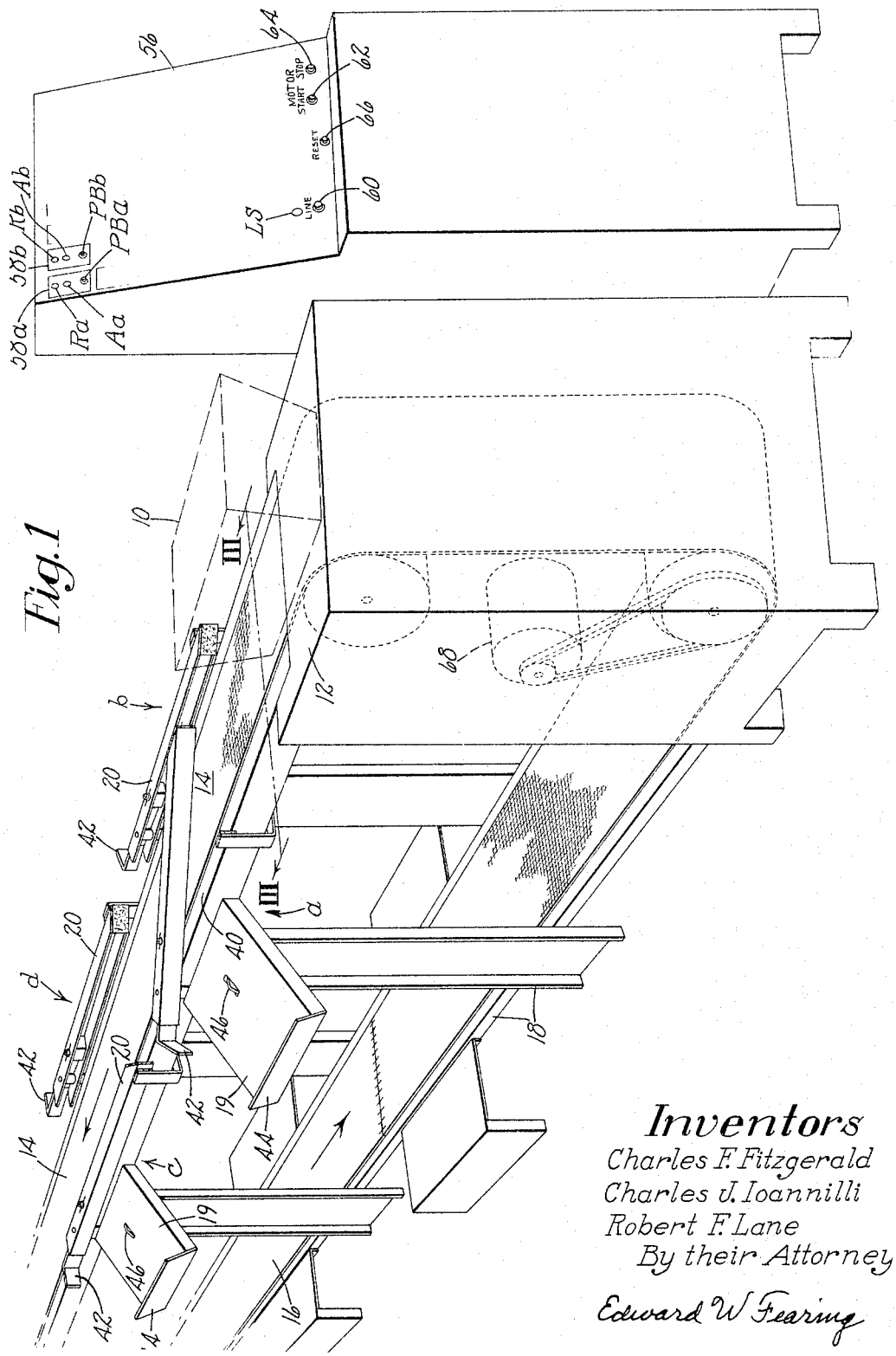
FIG. 1 is a perspective view looking from the supply and dispatch station toward a plurality of work stations in a conveyor system embodying the features of the present invention.

Prior frictional transportation by belt conveyors or work carriers having uniform dimensions has been predicated on the idea, that for reliable dispatch of articles to individual work stations it is necessary either to stop the belt when the article reaches a selected work station or that the article itself is stopped while the belt continues in motion. If the movement of the belt is stopped transportation of all articles is discontinued until the belt is restarted. If the article itself is stopped while the belt continues in motion then force must be applied to remove the article either through the action of the operator or by other external power. If the operator is required to remove the article, transportation of other articles may be delayed and if other power is provided for automatically removing the article further complication and expense in manufacturing and maintaining the transportation system is involved. In either event the conveyor system is tied up for the interval of time required to return a deflector to nonintercepting position.

In the system embodying the present invention it has been found possible to dispatch and distribute selectively articles of uniform dimensions, such as work carriers, without any of these handicaps and with the further advantages that no additional power actuated mechanism is required to remove an article or carrier from the conveyor belt outside of the kinetic energy of the article itself. For this purpose the velocity of the belt itself has been increased over that in common use with prior conveyor systems and any undesirable shock on the mechanical parts of the system has been compensated for so that impact, bouncing effects and imperfect placement of the articles being distributed become inconsequential, the increased velocity of belt movement improving the efficiency of the entire system.

In many respects the construction and mode of operation of the present conveyor system is similar to that of the system disclosed in the prior application. In common with the prior conveyor system the construction illustrated is intended to distribute carriers in the form of rectangular boxes 10 containing work for manufacturing processes from a supply and dispatch station 12 selectively to any of a plurality of work stations *a*, *b*, *c* and *d* disposed along the sides of the conveyor belt. The conveyor belt has an upper run 14 for transferring work carriers from the supply station 12 to any of the work stations and a lower run 16 for returning work carriers to the supply station, the belt being of the flat strip type slidably mounted to run along a double decked frame 18 joined to the supply station 12 and providing transportation for each carrier through frictional engagement with the base of the carrier.

Each carrier 10 is of conventional fiber or corrugated cardboard construction with the same width in its base as the height of the sides and one and one-half to two times as long as the width of the base. Each carrier forms an open sided box with the open side uppermost and the side walls tapered upwardly away from each other approximately one inch for each ten inches of height, so that when overfilled with work articles the center of gravity may be raised to two-thirds the height of the side walls. For this reason a limitation is imposed by instability of a filled box at the speed, with which it may be transported and diverted from the transportation belt, too abrupt an acceleration introducing a hazard from accidental upsetting both for the articles within the carrier boxes and for the operators at the work stations who are located too close to the conveyor to escape a scattering volley of articles.

In the machine of the prior application above identified, the speed at which the conveyor belt ordinarily travels is in the neighborhood of 250 feet per minute. While moving at this speed a loaded carrier box may be deflected from a conveyor belt with little or no appreciable impact, such as might upset the box and cause the articles contained therein to be scattered promiscuously. For this purpose each box deflector in the prior machine comprises a diverting arm movable across the conveyor belt to an intercepting position beyond the station where the box is to be removed, one corner of the box engaging the arm and sliding along it until it actuates a microswitch located on the arm. When the microswitch is actuated by engagement with the corner of the carrier box a fluid actuated mechanism is thrown into operation to swing the deflector together with the carrier box, partly in a reverse direction gently off the carrier belt and toward a storage platform where it is accessible to an operator. Thus, the deflector of the prior machine must first stop the progress of a carrier box while on the conveyor belt and then must move it off the belt at a slow speed onto a storage platform.

In the present invention, no separate slow speed carrier box moving mechanism is required and the hazard of upsetting the box is substantially avoided for the reason that the continued forward movement of a carrier box does not stop while being delivered but the kinetic energy of the box and its contents cause it to shift itself off the belt. To this end there is mounted on the deflector an abutment to arrest forward progress of the carrier box with the belt and to assist in actuating the deflector to a nonintercepting position. Accordingly, no time is lost in clearing the conveyor belt for dispatch of other carrier boxes.

For receiving the carrier boxes the storage platforms, indicated at 19, are secured to the frame 18 in spaced positions convenient for operators to reach work contained therein.

The deflectors of the illustrated conveyor system include a row of diverting arms 20 normally extending along opposite sides of the belt in parallel positions. Each arm is shiftable to intercept with a glancing impact a carrier box substantially in advance of a work station where it is to be delivered from the conveyor belt. The length of each diverting arm 20 is approximately twice as long as that in the system of the prior application. Thus, each arm forms a much smaller angle with the belt and is engaged by a carrier box in advance of rather than beyond the work station, as in the prior system. Each diverting arm is pivoted to move between a first or nonintercepting position outside the edge of the conveyor belt where it is held yieldingly and a second or intercepting position, in which the arm extends across the belt to a diagonal position in an upstream direction (see FIG. 2) at an angle of less than 30° with respect to the edges of the belt. With such a low angle of deflection a carrier box is first engaged at one corner with an arm and is diverted more gently off the belt with a glancing impact rather than with an abrupt shock, as in the prior system and the means for shifting the deflector to intercepting position consists of a conventional electromagnet 22 whose armature 23 is connected to the diverting arm rather than requiring a more expensive fluid powder actuated cylinder, as in the prior system.

The diverting arms 20 forming the deflectors are disposed in pairs, one of which is at the opposite side of the belt from the other, each one being of relatively light weight metal in the form of a hollow channel mounted to swing freely on a vertical pivot shaft 24 secured to the frame 18. For this purpose the channel has passing through it a bearing sleeve 26 (FIG. 4) welded to the flanges of the channel. Each electromagnet armature 23 (FIG. 3) is connected to a diverting arm by a tension spring 28 stretched between the armature and one arm of a cross bar 30 welded to the bearing sleeve 26. At the opposite side of the pivot shaft 24 a return spring 32 is stretched between the other arm of the cross bar 30 and the frame, the spring 32 being connected to the electromagnet and being of weaker force but having a higher initial strain than the spring 28. One purpose of the stronger actuating spring 28 is to enable the electromagnet to have its armature fully actuated to the limit of its movement before the diverting arm reaches the end of its intercepting movement across the conveyor belt, this happening because of the rapid movement of the armature and the inertia of the diverting arm. Thus, the diverting arm is moved gently under spring action and without injurious shock from its nonintercepting to an intercepting position, also affording another essential result to be described.

To limit the movement of each diverting arm between its two positions a stop in the form of a strap 33 is secured to the underside on the upper level of the frame, and is bent upwardly at its ends into the path of one in each pair of oppositely disposed diverter arms at either side of the conveyor belt. At each upstanding end of the strap is secured an impact damping pad 34 for one diverting arm and the end of each diverting arm is beveled and provided with a second impact damping pad 36 to engage and be supported by the opposite diverting arm of a pair when actuated across the conveyor belt.

A substantial portion of the kinetic energy in a work carrier box is absorbed by friction after being intercepted by a diverting arm. After a corner of a work carrier box first engages a diverting arm, it reaches a position shown in FIG. 2, in which the center of gravity of the box, indicated by the X-mark 38, moves beyond the edge of the upper pass in the conveyor belt. The box then begins to tilt downwardly about the edge of the conveyor belt as a fulcrum, thus reducing the frictional contact with the belt on the base of the box. The corner of the box engaging the diverting arm also exerts a frictional retarding force on the box as continued tilting causes the base of the box to bear against the edge of a sheet metal counter 40 carried by the frame along which counter the belt runs. The weight of the box bearing against the counter adds further frictional retardation to the forward movement of the box. The box then tilts still more on the edge of the counter until all the weight of the box is supported on the counter alone, no more forward force being imparted to the box by the belt. To enable the carrier box to tilt downwardly until its weight is supported entirely by the edge of the counter 40 without interference with the storage platform 19, the entire surface of each storage platform is fastened to the frame 18 at a lower position than the counter 40, as indicated in FIG. 3, providing an easy transfer of the box from counter to the platform. In its forward movement the box eventually is abruptly arrested and any final impact is avoided by dissipating the kinetic energy of the box frictionally and by returning the diverting arm to its original nonintercepting position.

To arrest forward movement of a work carrier box, according to an important feature of the invention, the box as it moves along the diverting arm engages a shock absorbing abutment in the form of a right angle bracket 42 adjustably secured to the trailing end of the arm. Any remaining force of impact exerted by the carrier box on the abutment bracket 42 is transferred to the diverting arm, moving it in a direction to rotate it about its pivot shaft, the free end of the diverting arm then swinging toward a nonintercepting position as it approaches the pad 34.

During actuation of the diverting arm toward its pad 34 the forward movement of a carrier box on the belt is transposed into right angle movement in a direction off the conveyor belt and onto a work storage platform 19. The action of swinging the diverting arm 20 about its pivot shaft also absorbs further energy from the carrier box, not only in overcoming the inertia of the diverting arm but also in moving the arm against the force of its actuating spring 28, the spring already having been stretched by actuation of the electromagnet 22. The abutment bracket 42, therefore, acts as a shock absorber while the spring 28 is being stressed further under the impact of a work carrier box.

Further stress in the already stretched spring 28 is continued until the carrier box drops completely off the counter 40 and is deposited on the work storage platform 19. When the carrier box reaches a stable position on the platform 19 the electromagnet 22 is de-energized and the box is brought to rest against a buffer plate 44 at the outer edge of the platform 19, releasing all of the stretch in the spring 28. This occurs while the diverting arm is close to its vibration damping pad 34. The diverting arm then is moved quickly against the pad 34 by the spring 32.

To insure a uniform and stable engagement of the box with the buffer plate 44 the platform 19 is inclined downwardly and outwardly away from the belt on the frame of the conveyor at an angle of about 30°. After all of the stress has been released from the spring 28 there is no tendency for the diverting arm to swing across the belt and the arm is retained in nonintercepting position by the action of the weaker return spring 32.

To de-energize the electromagnet 22 when the carrier box 10 reaches a stable position on the work storage platform 19 the platform has mounted on it a carrier box sensing lever 46 located in a position with relation to the buffer plate 44 at a distance less than the width of a carrier box. Beneath the work platform 19 is a microswitch 48 (see FIG. 3) arranged to be actuated by the sensing lever 46. By reason of the microswitch the circuit to the electromagnet is broken after the deflecting arm has swung toward its pad 34, so that the conveyor belt is cleared promptly for further use upon delivery of each carrier box.

In order to adapt the conveyor system to boxes of different lengths the shock absorbing abutment bracket 42 may be adjusted on the diverting arm 20 and for this purpose a shank portion of the bracket runs inside the channel forming the diverting arm between the base of the channel and the bearing sleeve 26 (see FIG. 4). Between the shank of the buffer arm and the sleeve 26 also is driven a wedge 50 having an enlarged head into which there is threaded a clamp screw 52. The clamp screw passes through a slot 54 in the uppermost flange of the diverting arm. When the wedge 50 is driven tightly between the sleeve 26 and the buffer bracket the screw 52 may be tightened, securing the wedge and buffer bracket securely in place. Loosening the screw 52 and the wedge 50 from clamping position enables adjustment of the buffer bracket to accommodate carrier boxes of a fairly large range of different lengths.

The operation of the illustrated conveyor system is generally the same as that in the prior application above identified. Referring to FIG. 1 the system is under the control of a dispatcher through the use of a control panel 56 having a series of control plates 58a, 58b, etc. Each control plate is provided with red and amber lights R and A and with a push buttom switch PB, the small letter on the drawings corresponding to the letter of the work station for which control is afforded. The control panel also provides at its lower portion a main line switch 60, motor start and stop buttons 62 and 64 and a reset button 66.

When the dispatcher at the control panel observes that a signal light, for example Ra, is lit she places a work carrier box at a ready position on the storage station 11 and depresses the push button PBa on the control plate. Each push button has two sets of contacts 1 and 2, the first of which completes a circuit through a coil S acting to magnetize a core for holding the push button depressed and the two contacts actuated thereby closed, the small letters corresponding to the designation of the work station. The second contact 2 in each station is connected to energize the solenoid 22 for actuating the diverting arm. The carrier box 10 is then pushed onto the conveyor belt and is intercepted by the diverting arm 20 of the station a; whereupon the box is diverted from the conveyor belt onto the storage platform 19 of the a station.

As soon as the carrier box 10 comes to rest on the storage platform of the a station and engages the sensing lever 46a of that station the contacts of the microswitch 48a are opened, de-energizing both the solenoid Sa and the coil 22a and extinguish both lights Ra and Aa, the push button PBa being thereby released and the contacts 1a and 2a being opened. The lights Ra and Aa remain extinguished until an operator removes the work carrier box from the platform 19 to return it to the supply station; whereupon the red light Ra is relighted but the amber light Aa still remains extinguished. The lighting of the red light without the amber light indicates to the dispatcher that at the station a, a new work carrier box is required and, accordingly, she makes the necessary provisions.

The start and stop buttons 62 and 64 are connected to energize a relay coil MC having contacts MCK and MCK1 for starting and stopping a motor 68 for driving the conveyor belt, and for holding the circuit to the relay coil closed after the start button 62 is released.

In case a mistake is made in selecting work stations for delivery of a carrier box the dispatcher depresses the reset button 66 for actuating a switch connected for de-energizing all of the control circuits, so that a wrongly depressed push button may be released and a new proper selection made.

By utilizing a conveyor system in which the kinetic energy of the work carrier boxes is capable of removing them from a carrier belt it is possible to increase the speed of the belt as much as 50% without any undesirable results in the way of destructive impacts, vibration of the supporting frame 18 or wear and tear on the boxes of articles therein. Furthermore, the carrier boxes are delivered and the belt is cleared for further use more promptly after dispatching than with prior conveyors.

The nature and scope of the invention having been indicated and a particular embodiment having been described, what is claimed is:

1. In a conveyor system for selectively distributing articles from a supply station to any of a plurality of work stations, said system comprising a belt, a series of deflectors disposed along the belt, one mounted at each work station for movement across the belt into a diagonal position which will intercept an approaching carrier on the belt, a storage platform for each work station, means for moving the belt from the supply station past the work stations at a velocity which will project a carrier against a deflector extending across the belt with a glancing impact and will shift the carrier off the belt to the storage platform, and means for moving the deflector to the intercepting position, the improvement comprising a shock absorbing abutment mounted on each deflector to arrest forward progress of the carrier and to shift both the carrier off the belt and the deflector into the non-intercepting position, and a spring connected between the deflector and its actuatiang means to be stressed by the actuating means in moving the deflector across the belt and to be stressed further in shifting the deflector off the belt.

2. In a conveyor system for selectively distributing articles from a supply station to any of a plurality of work stations, said system comprising a belt, a series of deflectors disposed along the belt, one mounted at each work station for movement across the belt into a diagonal position which will intercept an approaching carrier on the belt, a storage platform for each work station, means for moving the belt from the supply station past the work stations at a velocity which will project a carrier against a deflector extending across the belt with a glancing impact and will shift the carrier off the belt to the storage platform, and means for moving the deflector to the intercepting position, the improvement comprising a shock absorbing abutment mounted on each deflector to arrest forward progress of the carrier and to shift both the carrier off the belt and the deflector into non-intercepting position, a spring connected between the deflector and its actuating means to be stressed by the actuating means in moving the deflector across the belt, and carrier sensing means at each work station which causes the stress in the spring to be released as each carrier is brought to rest at that work station.

3. In a conveyor system for selectively distributing articles from a supply station to any of a plurality of work stations, said system comprising a belt, a series of deflectors disposed along the belt, one mounted at each work station for movement across the belt into a diagonal position which will intercept an approaching carrier on the belt, a storage platform for each work station, means for moving the belt from the supply station past the work stations at a velocity which will project a carrier against a deflector extending across the belt with a glancing impact and will shift the carrier off the belt to the storage platform, and means for moving the deflector to the intercepting position, the improvement comprising a shock absorbing abutment mounted on each deflector to arrest forward progress of the carrier and to shift both the carrier off the belt and the deflector into non-intercepting position, a spring connected between the deflector and its actuating means to be stressed by the actuating means in moving the deflector across the belt, carrier sensing means on each storage platform for causing the stress in the spring to be released as the carrier is brought to rest on that platform, and a buffer plate mounted on each storage platform in a position with relation to the sensing lever at a distance less than the width of the carrier to insure engagement of the carrier after brought to rest with the sensing lever.

4. In a conveyor system for selectively distributing articles from a supply station to any of a plurality of work stations, said system comprising a belt, a series of deflectors disposed along the belt, one mounted at each work station for movement across the belt into a diagonal position which will intercept an approaching carrier on the belt, a storage platform for each work station, means for moving the belt from the supply station past the work stations at a velocity which will project a carrier against a deflector extending across the belt with a glancing impact and will shift the carrier off the belt to the storage platform, and means for moving the deflector to the intercepting position, the improvement comprising a shock absorbing abutment mounted on each deflector to arrest forward progress of the carrier and to shift both the carrier off the belt and the deflector into non-intercepting position, a spring connected between the deflector and its actuating means to be stressed by the actuating means in moving the deflector across the belt, carrier sensing means on each storage platform for causing the stress in the spring to be released as the carrier is brought to rest on that platform, and a buffer plate mounted on each work storage platform in a position with relation to the sensing lever at a distance less than the width of the carrier to insure engagement of the carrier after being brought to rest with the sensing lever, each storage platform being inclined downwardly and outwardly from the frame away from the belt to insure a uniform and stable engagement of the box with the buffer plate.

5. In a conveyor system for selectively distributing articles from a supply station to any of a plurality of work stations, said system comprising a belt, a series of deflectors disposed along the belt, one at each work station mounted for movement across the belt into a diagonal position which will intercept an approaching carrier on the belt, a storage platform for each work station, means for moving the belt from the supply station past the work stations at a velocity which will project a carrier against a deflector extending across the belt with a glancing impact and will shift the carrier off the belt to the storage platform, the improvement comprising a solenoid for actuating the deflector, a shock absorbing abutment mounted on each deflector to arrest forward progress of the carrier and to shift both the carrier off the belt and the deflector into non-intercepting position, a spring connected between the deflector and the solenoid to be stressed by the solenoid in moving the deflector across the belt, a carrier sensing lever on each storage platform and a switch actuated by the carrier sensing lever for opening the circuit to the solenoid as each carrier is brought to rest on the storage platform.

6. In a conveyor system for selectively distributing articles from a supply station to any of a plurality of work stations, said system having storage stations arranged on opposite sides of the belt, and deflectors in the form of diverting arms arranged in pairs, one at each side of the belt for opposite work stations and pivotally mounted for movement across the belt into a diagonal position toward the other of the pair for intercepting an approaching carrier on the belt, the improvement comprising an electromagnet including an armature for actuating each diverting arm to intercepting position and a spring connected between each diverting arm and the armature of its electromagnet to enable each armature to be actuated to the limit of its movement before the connected diverting arm begins to move.

7. In a conveyor system for selectively distributing articles from a supply station to any of a plurality of work stations, said system having storage stations arranged on opposite sides of the belt, and deflectors in the form of diverting arms arranged in pairs, one at each side of the belt and pivotally mounted for movement across the belt into a diagonal position toward the other of the pair for intercepting an approaching carrier on the belt, the improvement comprising an electromagnet including an armature for actuating each diverting arm to intercepting position, a spring connected between each diverting arm and the armature of its electromagnet to enable each armature to be actuated to the limit of its movement before the connected diverting arm begins to move, and an impact damping pad mounted on each diverting arm to enable it while being moved toward intercepting position under spring action to be stopped without injurious shock.

8. In a conveyor system for selectively distributing articles from a supply station to any of a plurality of work stations, said system having storage stations arranged on opposite sides of the belt, and deflectors in the form of diverting arms arranged in pairs, one at each side of the belt for opposite work stations and pivotally mounted for movement across the belt into a diagonal position toward the other of the pair for intercepting an approaching carrier on the belt, the improvement comprising an electromagnet including an armature for actuating each diverting arm to intercepting position, a spring connected between each diverting arm and the armature of its electromagnet to enable each armature to be actuated to the limit of its movement before the connected diverting arm begins to move, an impact damping pad mounted on each diverting arm to avoid injurious shock during movement of the diverting arm to its intercepting position, a second spring connected to each diverting arm for moving the diverting arm to non-intercepting position, a stop provided for limiting the movement of the diverting arm, and a second impact damping pad mounted on the stop to be engaged by the diverting arm when the diverting arm is actuated into non-intercepting position.

References Cited by the Examiner

UNITED STATES PATENTS

| | | | |
|---|---|---|---|
| 1,427,325 | 8/1922 | Quick | 198—188 X |
| 2,043,293 | 6/1936 | Jennings | 198—38 X |
| 2,298,829 | 10/1942 | McCann | 198—38 X |
| 2,792,102 | 5/1957 | Schuchert. | |
| 2,924,324 | 2/1960 | Benson | 198—19 X |
| 3,049,247 | 8/1962 | Lemelson | 198—185 X |

EVON C. BLUNK, *Primary Examiner.*

EDWARD A. SROKA, *Examiner.*